United States Patent
Ho et al.

(10) Patent No.: US 8,014,745 B1
(45) Date of Patent: Sep. 6, 2011

(54) HIGH ISOLATION MULTIPLE CARRIER SYSTEM ARCHITECTURE FOR COMMUNICATIONS

(75) Inventors: Thinh Q. Ho, Anaheim, CA (US); Stephen M. Hart, San Jose, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 457 days.

(21) Appl. No.: 12/389,610

(22) Filed: Feb. 20, 2009

(51) Int. Cl.
*H04B 15/00* (2006.01)
(52) U.S. Cl. .................................................. 455/278.1
(58) Field of Classification Search ............... 455/278.1, 455/272, 269
See application file for complete search history.

(56) References Cited

U.S. PATENT DOCUMENTS

| | | |
|---|---|---|
| 6,181,286 B1 | 1/2001 | Roscoe et al. |
| 6,211,671 B1 | 4/2001 | Shattil |
| 6,275,196 B1 | 8/2001 | Bobier |
| 6,907,093 B2 | 6/2005 | Blount et al. |
| 6,968,171 B2 * | 11/2005 | Vanderhelm et al. ......... 455/296 |
| 6,992,641 B1 | 1/2006 | Sanelli |
| 7,084,823 B2 | 8/2006 | Caimi et al. |
| 2004/0227683 A1 | 11/2004 | Caimi et al. |
| 2006/0270368 A1 | 11/2006 | Caimi et al. |
| 2007/0096919 A1 | 5/2007 | Knadle, Jr. et al. |
| 2007/0117514 A1 | 5/2007 | Gainey et al. |
| 2010/0197231 A1 * | 8/2010 | Kenington ................... 455/63.1 |

\* cited by examiner

*Primary Examiner* — Stephen Jones
(74) *Attorney, Agent, or Firm* — Kyle Eppele; Peter A. Lipovsky; Celia C. Dunham

(57) ABSTRACT

A compensation apparatus for an integrated communication system is disclosed. The integrated communication system can include a first communication device having a first transmitter antenna, and a second communication device having a second receiver antenna, wherein the second receiver antenna is in appreciable proximity of the first transmitter antenna such that the second receiver antenna picks up substantial electromagnetic interference from the first communication device. The compensation apparatus can include an isolation device having compensation circuitry coupling the first transmitter antenna and the second receiver antenna and configured to adaptively cancel the electromagnetic interference from the first communication device at the second receiver antenna.

19 Claims, 5 Drawing Sheets

US 8,014,745 B1

HIGH ISOLATION MULTIPLE CARRIER SYSTEM ARCHITECTURE FOR COMMUNICATIONS

FEDERALLY-SPONSORED RESEARCH AND DEVELOPMENT

This invention (Navy Case No. 79847) was developed with funds from the United States Department of the Navy. Licensing inquiries may be directed to Office of Research and Technical Applications, Space and Naval Warfare Systems Center, San Diego, Code 2112, San Diego, Calif., 92152; telephone 619-553-2778; email: T2@spawar.navy.mil.

BACKGROUND

1. Field

This disclosure relates to methods and systems for improving noise-isolation/cross coupling of communication systems.

2. Background

The conventional approach for achieving multiple communications functions is to use different antennas with each antenna providing for one function. In such a configuration, these antennas should be spaced far enough apart physically so that electromagnetic isolation between systems may be achieved by the virtue of the spatial distance.

Unfortunately, this approach may not be available in small environments, such as aircraft and ships, where space is limited and a large variety of functions are necessary for efficient operation. Accordingly, new technology related to the integration of communication systems is desirable.

SUMMARY

Various aspects and embodiments of the invention are described in further detail below.

In a first series of embodiments, a compensation apparatus for an integrated communication system is disclosed. The integrated communication system includes a first communication device having a first transmitter antenna, and a second communication device having a second receiver antenna, wherein the second receiver antenna is in appreciable proximity of the first transmitter antenna such that the second receiver antenna picks up substantial electromagnetic interference from the first communication device. The compensation apparatus includes an isolation device having compensation circuitry coupling the first transmitter antenna and the second receiver antenna and configured to adaptively cancel the electromagnetic interference from the first communication device at the second receiver antenna.

In yet another series of embodiments, a compensation apparatus for an integrated communication system is disclosed. The integrated communication system includes a first communication device having a first transmitter antenna, and a second communication device having a second receiver antenna, wherein the second receiver antenna is in appreciable proximity of the first transmitter antenna such that the second receiver antenna picks up substantial electromagnetic interference from the first communication device. The compensation apparatus includes an isolation means for adaptively canceling electromagnetic interference from the first communication device at the second receiver antenna, and a first coupler coupling the isolation means to the second receiver antenna.

BRIEF DESCRIPTION OF THE DRAWINGS

The features and nature of the present disclosure will become more apparent from the detailed description set forth below when taken in conjunction with the accompanying drawings in which reference characters identify corresponding items.

DETAILED DESCRIPTION

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
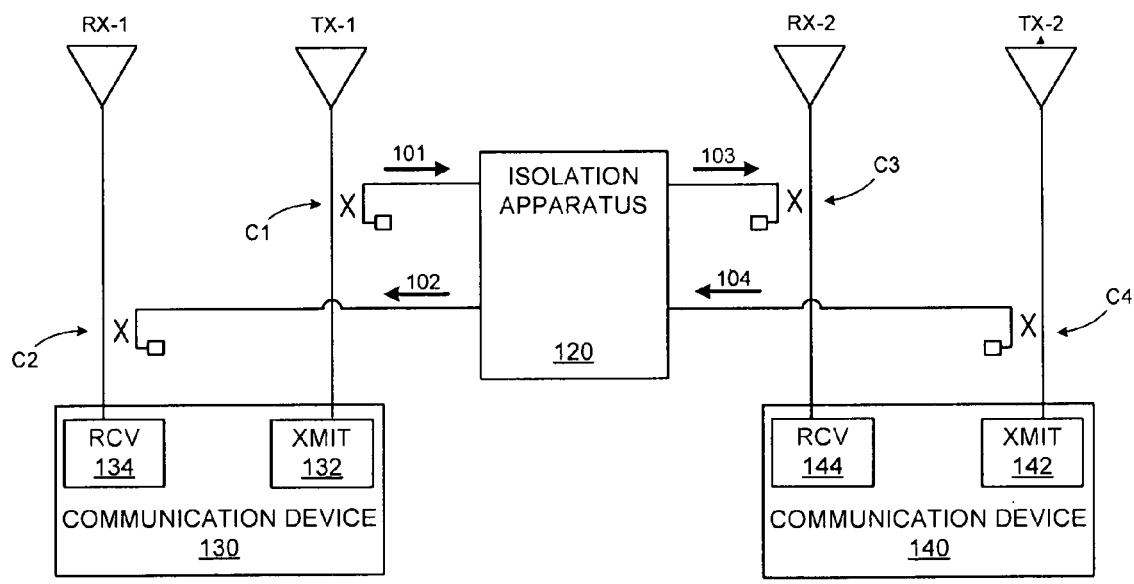
FIG. 1 depicts an exemplary communication system having an isolation apparatus.

FIG. 1 depicts an exemplary communication system having an isolation apparatus 120. As shown in FIG. 1, the exemplary communication system includes a first communication device 130 having a transmitter 132 and a receiver 134, and a second communication device 140 having a transmitter 142 and a receiver 144. Transmitters 132 and 142 have transmit antennas TX-1 and TX-2 respectively, and receivers 134 and 144 have receiver antennas RX-1 and RX-2 respectfully. An isolation apparatus 120 is connected to transmit antenna TX-1 via coupler C1, to receiver antenna RX-1 via coupler C2, to receiver antenna RX-2 via coupler C3, and to transmitter coupler TX-2 via coupler C4.

In operation, communication devices 130 and 140 may operate independently or interdependently, and may be located such that there may be electromagnetic interference between the two systems. For example, receiver antenna RX-1 may be in appreciable proximity of the transmitter antenna TX-2 such that receiver antenna RX-1 picks up substantial electromagnetic interference from the second communication device 140. Similarly, receiver antenna RX-2 may be in appreciable proximity of the transmitter antenna TX-1 such that receiver antenna RX-2 picks up substantial electromagnetic interference from the first communication device 130.

In order to compensate for this generally undesirable electromagnetic cross-coupling, the isolation apparatus 120 may be employed to actively cancel such interference. For example, using coupler C1, the isolation apparatus 120 may receive coupled signal 101 from transmitter antenna TX-1, then apply an appropriate phase and amplitude adjustment to produce compensation signal 103, which may be coupled into receiver antenna RX-2 via coupler C3. Assuming that the amplitude and phase are appropriately adjusted, the electromagnetic interference at receiver antenna RX-2 from transmitter antenna TX-1 may be minimized.

Similarly, using coupler C4, the isolation apparatus 120 may receive signal 104 from transmitter antenna TX-2, then apply an appropriate phase and amplitude adjustment to produce signal 102, which may be coupled into receiver antenna RX-1 via coupler C2. Again assuming that the amplitude and phase are appropriately adjusted, the electromagnetic interference at receiver antenna RX-1 from transmitter antenna TX-2 may be minimized.

Figure 2:
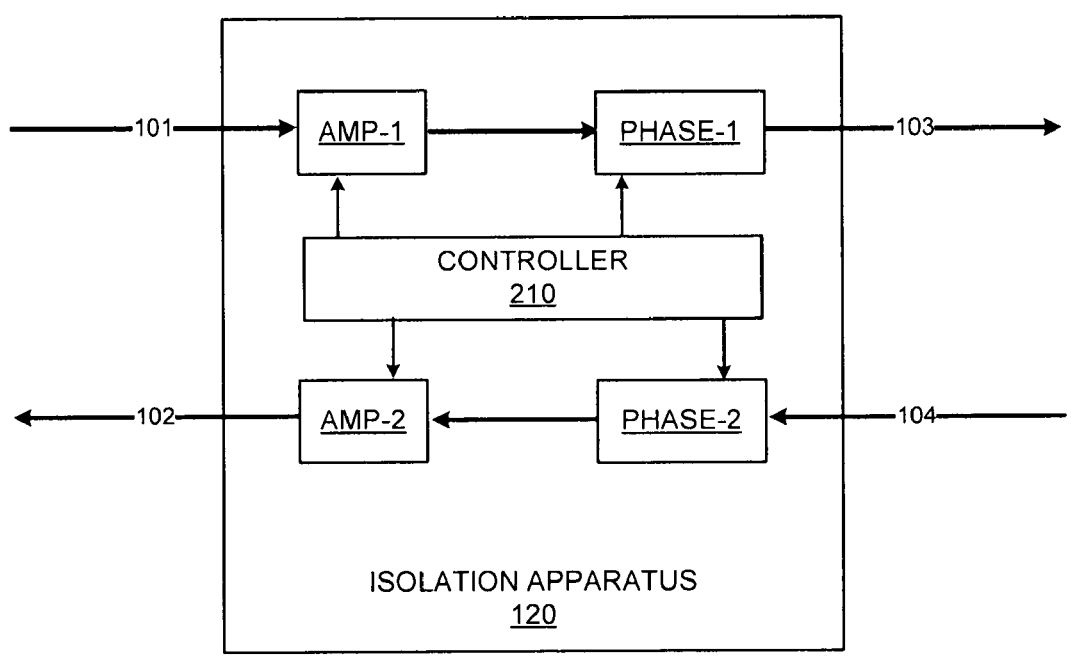
FIG. 2 depicts the exemplary isolation apparatus of FIG. 1.

Continuing, FIG. 2 depicts the exemplary isolation apparatus of FIG. 1. As shown in FIG. 2, the isolation apparatus 120 includes a first amplifier circuit AMP-1 and a first phase adjustment circuit (or phase delay circuit) PHASE-1 for appropriately processing signal 101 to produce signal 103. The isolation apparatus 120 also includes a second amplifier circuit AMP-2 and a second phase adjustment circuit (or phase delay circuit) PHASE-2 for appropriately processing coupled signal 104 to produce compensation signal 102. In the present example, devices AMP-1, AMP-2, PHASE-1 and PHASE-2 may be controlled by controller 210, which may use any number of known or later developed adaptive signal processing techniques, such as a steepest descent algorithm or a specially designed adaptive neural network, to adapt signals 102 and 103 such that they may appropriately cancel unwanted electromagnetic interference at the appropriate receiver antennas. As adaptive techniques for noise cancellation are well known in the relevant arts, no further discussion will be provided.

Figure 3:
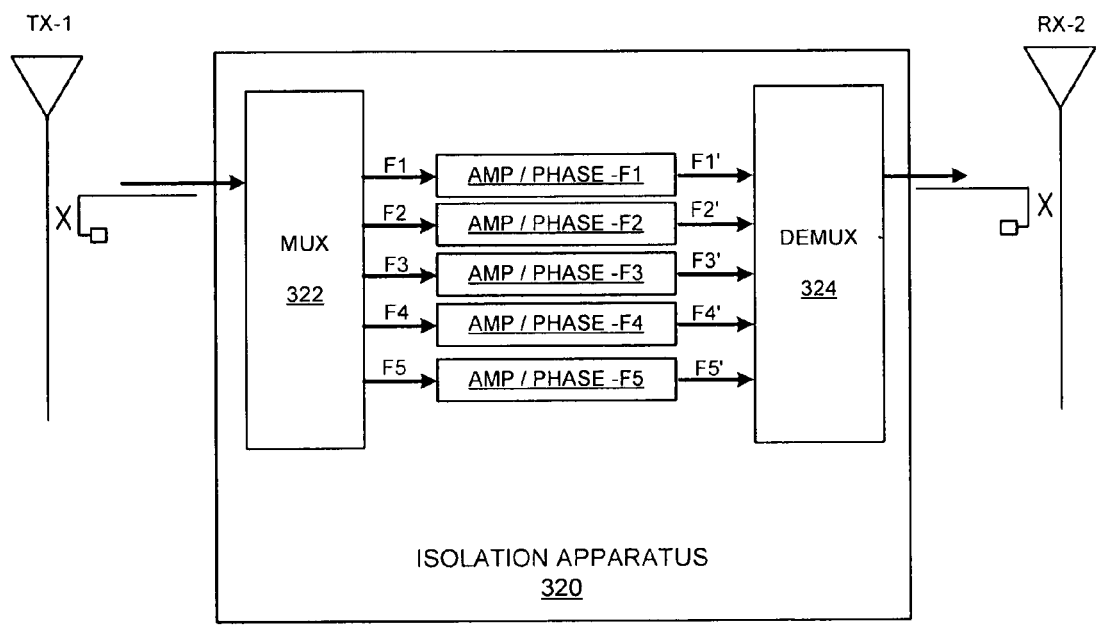
FIG. 3 depicts a second exemplary isolation apparatus.

FIG. 3 depicts a second exemplary isolation apparatus 320. The second exemplary isolation apparatus 320 includes a multiplexer 322 for dividing a transmitted signal into five separate frequency sub-ranges F1 . . . F5, a plurality of compensation circuits AMP/PHASE F1 . . . AMP/PHASE F5 coupled to the multiplexer 322 for producing five separate compensated signals F1' . . . F5', and a frequency demultiplexer 324 for demultiplexing/combining compensated signals F1' . . . F5' into a single output. While a system employing five separate sub-ranges is depicted in the present example of FIG. 3, it should be appreciated that the concept may be adapted to any number of separate frequency components.

Continuing, depending on the particular circumstances, it may be extremely difficult to form a compensated signal from a transmitted signal having a broad frequency spectrum, especially given that "free-air" coupling between a transmitter and a closely located receiver may be highly frequency dependent. In such cases, the configuration of the second exemplary isolation apparatus 320 may be useful to produce a single compensated signal by allowing the separate compensation circuits AMP/PHASE F1. AMP/PHASE F5 to separately process the different frequency ranges F1 . . . F5 as may be appropriate.

Figure 4:
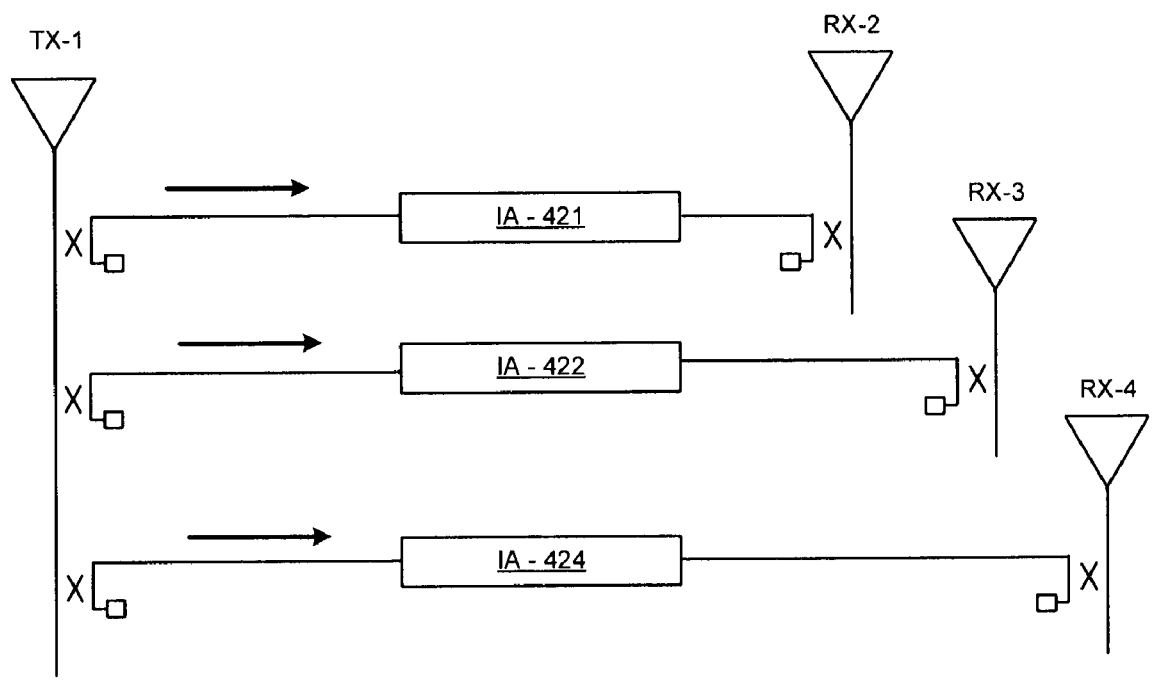
FIG. 4 depicts a single transmitter and multiple receivers in context with multiple isolation apparatuses.
Figure 5:
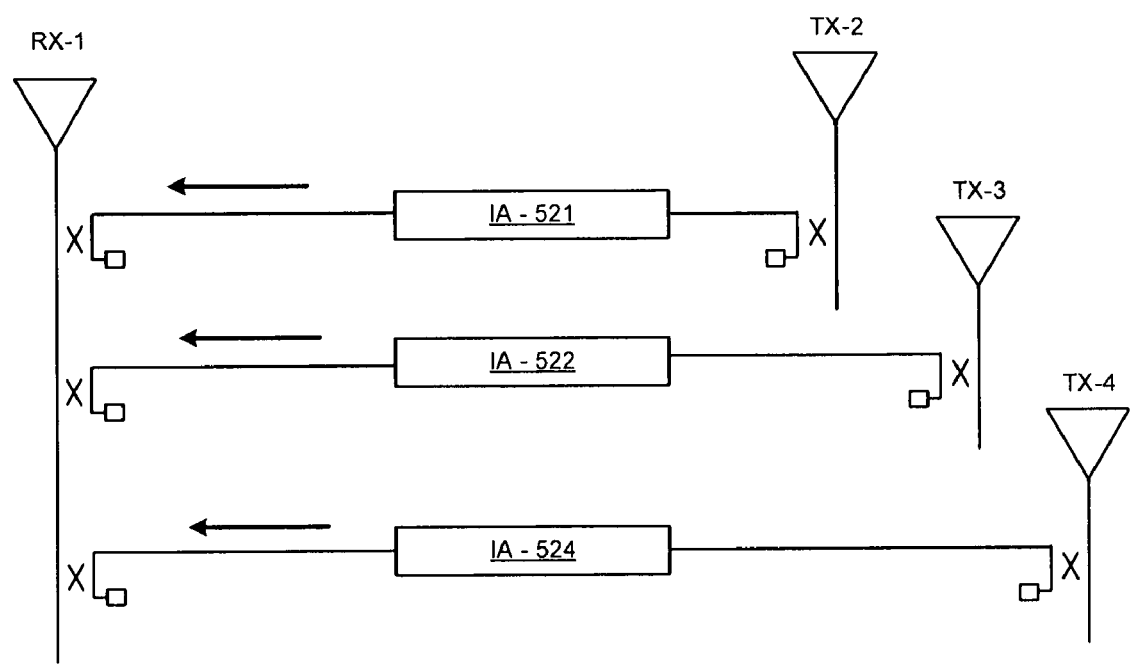
FIG. 5 depicts a single receiver and multiple transmitters in context with multiple isolation apparatuses.

Continuing, FIG. 4 depicts a single transmitter antenna and multiple receiver antennas in context with multiple isolation apparatuses IA-421, IA-422 and IA-424 demonstrating that the concepts of FIGS. 1-3 may be adapted to a 1-to-N ratio, where N is the number of receivers. Similarly, FIG. 5 depicts a single receiver antenna and multiple transmitter antennas in context with multiple isolation apparatuses IA-521, IA-522 and IA-524 demonstrating that the concepts of FIGS. 1-3 may be adapted to a M-to-1 ratio, where M is the number of transmitters. In view of FIGS. 4 and 5, it should be appreciated that the isolation concepts disclosed herein may be further adapted to any M-to-N ratio of transmitters and receivers.

In various embodiments where the above-described systems and/or methods may be implemented using a programmable device, such as a computer-based system or programmable logic, it should be appreciated that the above-described systems and methods can be implemented using any of various known or later developed programming languages, such as "C", "C++", "FORTRAN", "Pascal", "VHDL" and the like.

Accordingly, various storage media, such as magnetic computer disks, optical disks, electronic memories and the like, can be prepared that can contain information that can direct a device, such as a computer, to implement the above-described systems and/or methods. Once an appropriate device has access to the information and programs contained on the storage media, the storage media can provide the information and programs to the device, thus enabling the device to perform the above-described systems and/or methods.

For example, if a computer disk containing appropriate materials, such as a source file, an object file, an executable file or the like, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods and coordinate the functions of the individual systems and/or methods related to communications.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

CONCLUSION

It will be understood that many additional changes in the details, materials, steps and arrangement of parts, which have been herein described and illustrated to explain the nature of the invention, may be made by those skilled in the art within the principal and scope of the invention as expressed in the appended claims.

What is claimed is:

1. A compensation apparatus for an integrated communication system, the integrated communication system having a first communication device including a first transmitter antenna, and a second communication device including a second receiver antenna, wherein the second receiver antenna is in appreciable proximity of the first transmitter antenna such that the second receiver antenna picks up electromagnetic interference from the first communication device, the compensation apparatus comprising:
   an isolation device having compensation circuitry coupling the first transmitter antenna and the second receiver antenna and configured to adaptively cancel the electromagnetic interference from the first communication device at the second receiver antenna.

2. The apparatus of claim 1, wherein the compensation circuitry includes an amplification device configured to adaptively change an amplitude of a transmitter compensation signal to the second receiver antenna.

3. The apparatus of claim 1, wherein the compensation circuitry includes an amplification device configured to adaptively change an amplitude of a transmitter compensation signal from the first transmitter antenna to adaptively cancel the electromagnetic interference from the first communication device at the second receiver antenna.

4. The apparatus of claim 3, wherein the compensation circuitry includes a phase-shifting device configured to adaptively change a phase of the transmitter compensation signal.

5. The apparatus of claim 1, wherein the compensation circuitry includes a set of two or more first compensation circuits for compensating within a respective frequency sub-range of a transmitter signal.

6. The apparatus of claim 1, wherein the compensation circuitry includes a frequency dividing circuit for dividing a transmitter compensation signal to the second receiver antenna to produce a plurality of frequency sub-ranges, and a plurality of first compensation circuits coupled to the multiplexer, each first compensation circuit being configured to compensate within a respective frequency sub-range of the frequency dividing circuit to produce a plurality of compensated signals.

7. The apparatus of claim 6, wherein the compensation circuitry further includes a frequency demultiplexing circuit configured to combine the compensated signals produced by the plurality of compensation circuits.

8. The apparatus of claim 6, wherein each of the plurality of compensation circuits includes an adaptive amplifying circuit and an adaptive phase-shifting circuit.

9. The apparatus of claim 1, wherein the integrated communication system further includes a third communication device having a third receiver antenna, wherein the third receiver antenna is in appreciable proximity of the first transmitter antenna such that the third receiver antenna picks up substantial electromagnetic interference from the first communication device, the apparatus further comprising:
   a second isolation device having compensation circuitry coupling the first transmitter antenna and the third receiver antenna and configured to adaptively cancel the electromagnetic interference from the first communication device at the third receiver antenna.

10. The apparatus of claim 1, wherein the integrated communication system further includes a third communication device including a third transmitter antenna, wherein the second receiver antenna is in appreciable proximity of the third transmitter antenna such that the second receiver antenna picks up substantial electromagnetic interference from the third communication device, the apparatus further comprising a third isolation device having compensation circuitry coupling the third transmitter antenna and the second receiver antenna and configured to adaptively cancel the electromagnetic interference from the third communication device at the second receiver antenna.

11. An integrated communication system including a compensation apparatus, the integrated communication system including a first communication device having a first transmitter antenna, and a second communication device having a second receiver antenna, wherein the second receiver antenna is in appreciable proximity of the first transmitter antenna such that the second receiver antenna picks up substantial electromagnetic interference from the first communication device, the compensation apparatus comprising:
   an isolation means for adaptively canceling electromagnetic interference from the first communication device at the second receiver antenna; and
   a first coupler coupling the isolation means to the second receiver antenna.

12. The system of claim 11, wherein the compensation means includes an amplification means for adaptively changing an amplitude of a transmitter compensation signal to the second receiver antenna.

13. The system of claim 11, wherein the compensation means includes an amplification means for adaptively changing an amplitude of a transmitter compensation signal from the first transmitter antenna to adaptively cancel the electromagnetic interference from the first communication device at the second receiver antenna.

14. The system of claim 13, wherein the compensation means includes a phase-shifting means adaptively changing a phase of the transmitter compensation signal.

15. The system of claim 11, wherein the compensation means includes a set of two or more compensation circuits for compensating within a respective frequency sub-range of a transmitter signal.

16. The system of claim 11, wherein the compensation means includes a frequency dividing means for dividing a transmitter compensation signal to the second receiver antenna, and a plurality of compensation circuits coupled to the multiplexer, each compensation circuit for compensating within a respective frequency sub-range of the frequency dividing circuit.

17. The system of claim 16, wherein the compensation means further includes a frequency demultiplexing means for demultiplexing compensated signals produced by the plurality of compensation circuits.

18. The system of claim 11, wherein the communication system further includes a third communication device having a third receiver antenna, wherein the third receiver antenna is in appreciable proximity of the first transmitter antenna such that the third receiver antenna picks up substantial electromagnetic interference from the first communication device, the system further comprising:
   a second isolation means for adaptively canceling the electromagnetic interference from the first communication device at the third receiver antenna.

19. The system of claim 11, wherein the communication system further includes a third communication device having a third transmitter antenna, wherein the second receiver antenna is in appreciable proximity of the third transmitter antenna such that the second receiver antenna picks up substantial electromagnetic interference from the third communication device, the system further comprising:
   a third isolation means for adaptively canceling the electromagnetic interference from the third communication device at the second receiver antenna.

* * * * *